Aug. 4, 1936. W. E. DEMILL 2,049,833
MECHANICAL STOKER
Filed June 22, 1929
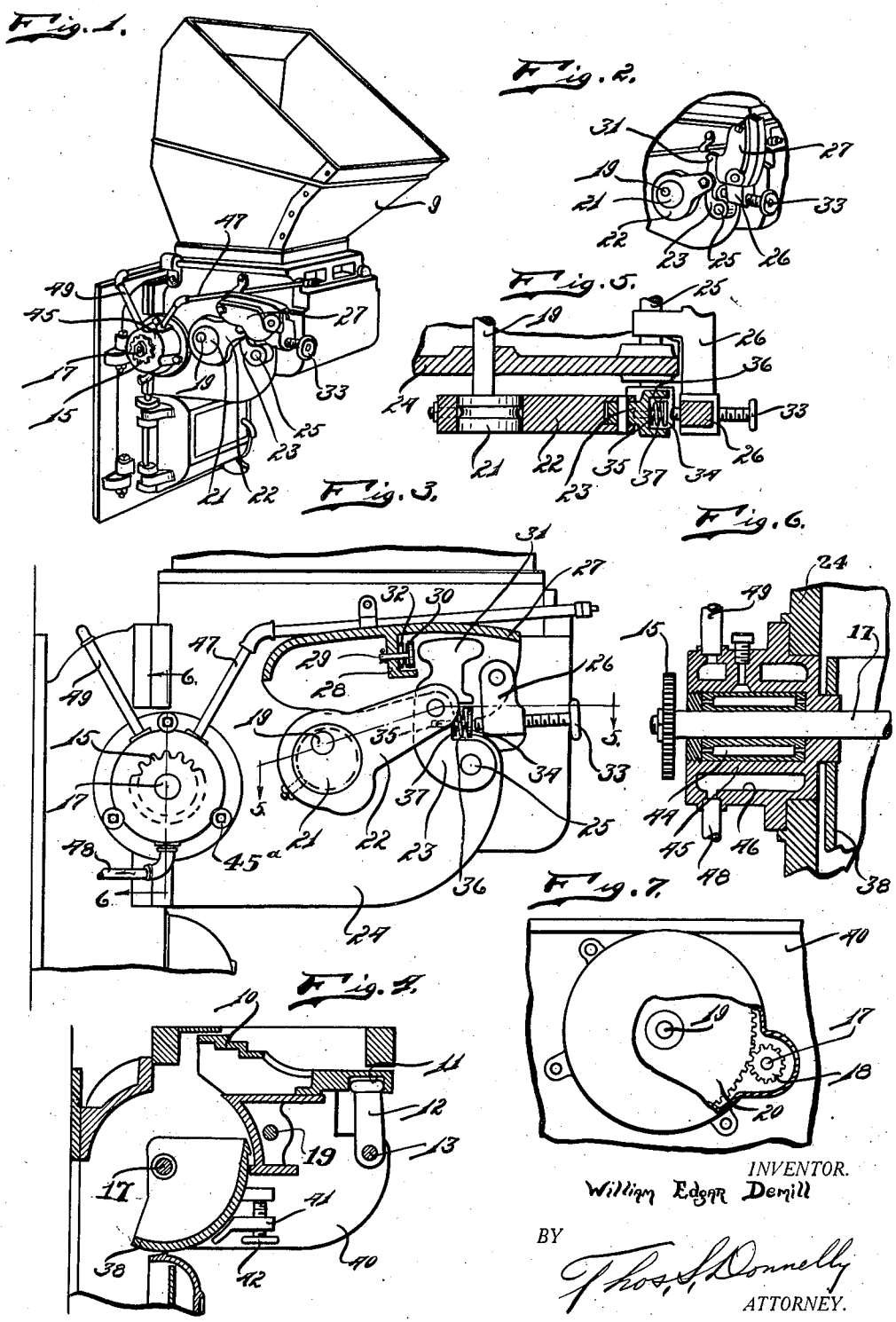
INVENTOR.
William Edgar Demill
BY
Thos. S. Donnelly
ATTORNEY.

Patented Aug. 4, 1936

2,049,833

UNITED STATES PATENT OFFICE 2,049,833

MECHANICAL STOKER

William Edgar Demill, Galt, Canada

Application June 22, 1929, Serial No. 372,831

3 Claims. (Cl. 110—101)

My invention relates to a new and useful improvement in a mechanical stoker and particularly an agitating mechanism for use with the stoker together with cooled bearings for use on the stoker.

It is an object of the present invention to provide in a mechanical stoker a bearing which will successfully stand up and operate under excessive temperatures.

Other objects will appear hereinafter.

The invention consists in the combination and arrangement of parts hereinafter described and claimed.

The invention will be best understood by a reference to the accompanying drawing which forms a part of this specification and in which, Fig. 1 is a perspective view of a stoker embodying the invention.

Fig. 2 is a fragmentary perspective view of the invention showing it in inoperative position.

Fig. 3 is an enlarged side elevational view with parts removed and parts shown in section.

Fig. 4 is a fragmentary sectional view of the invention.

Fig. 5 is a view taken on line 5—5 of Fig. 3.

Fig. 6 is a view taken on line 6—6 of Fig. 3.

Fig. 7 is a fragmentary side elevational view with parts broken away.

In the drawing I have illustrated the invention used with a mechanical stoker of the type shown and described in the patent to Swift No. 1,140,207 dated May 18, 1915, and comprising a main casing having a hopper 9 positioned above a reciprocating fuel feeder 10 in which is formed a slot 11 for reception of one end of an operating arm 12 which is fixedly mounted on the shaft 13. A transversely extending shaft 17 which in practice is provided with a suitable fuel feeding device carries a gear 15 which may be connected to a sprocket chain or any other suitable mechanism for rotating the shaft 17. This shaft extends to the opposite side of the stoker and carries a gear 18 meshing with a larger gear 20 mounted on a shaft 19. The shaft 17 extends through the stoker casing and is mounted in roller bearings which are in turn mounted in and carried by the water-cooled bearing members 45 suitably secured by bolts 45ª to the casing side walls 24 as is manifest from an inspection of Figs. 3 and 6. The shaft 19 also extends through the stoker casing from one side thereof to the other, but this shaft is not mounted in roller bearings and the bearings therefore are not water-cooled for the reason that the movement of this shaft 19 is much slower than that of shaft 17 and moreover, the shaft 19 is further from the hot portions of the furnace and is otherwise more favorably located than the shaft 17. The shaft 19 carries an eccentric arm 22. This arm 22 is pivotally connected to the rocker arm 23 which is pivotally mounted on the side wall 24 about the shaft 25 as an axis. Fixedly mounted on the shaft 25 is an arm 26 to which there is pivotally connected the cover 27 and on which cover 27 is formed the depending lug 28 projected through which is the yieldable pin 29 having the head 30 engageable with the head 31 of the arm 23 upon movement of the eccentric 21 to predetermined positions. A spring 32 is positioned between the lugs 28 and the head 30. An adjusting screw 33 is extended through and having a threaded engagement with the member 26.

In operation, when the eccentric 21 is rotated, the head 34 of the yieldable pin 35, which is mounted so that it can be projected slidably into a socket 36 formed in the member 23, engages the end of the adjusting screw 33 so as to effect a rocking of the shaft 25 in one direction to wit, in a rearward direction, a spring 37 being positioned in embracing relation on the pin 35 provides for the yielding movement of the pin. When the eccentric moves in the opposite direction, the head 31 is brought into engagement with the head 30 of the other yielding pin, this forces a rocking of the shaft 25 in the opposite direction to wit, in a forward direction and effects a completion of the reciprocation of the reciprocating fuel feeder 10 so that the coal deposited in the hopper 9 may fall onto the delivery apron 38 which is rockably mounted on trunnions of the housing or bearing 45. Mounted on the wall section 40 of the main casing is a lug 41 through which is threaded the adjusting screw 42 for positioning the delivery apron 38 to obtain the desired trajectory of the fuel discharged by the fuel feeding device (not shown).

When desired the cover 27 may be swung upwardly as shown in Fig. 2 into inoperative position so that further agitation of the material in the hopper 9 cannot be effected.

The shaft 17 is projected through a roller bearing 44 which journalled in the housing or bearing 45 having a water jacket or chamber 46 formed therein and into which leads a delivery pipe 47 and an outlet pipe 48 to deliver water to the chamber 46. A pipe 49 serves to connect the bearings at opposite sides which may or may not have an outlet pipe, as desired. With the bearing water cooled in this manner, it may be positioned in a hot place and be maintained in a cooled condition at all times. The trunnions on which the delivery apron is mounted extend through the side walls 24 of the stoker casing and project inwardly beyond the side walls 24 and support said delivery apron 38 independently of the shaft 17.

While I have illustrated and described the preferred form of my invention, I do not wish to limit myself to the precise details of structure shown but desire to avail myself of such variations and modifications as come within the scope of the appended claims.

Having thus described my invention, what I claim as new and desire to secure by Letters Patent is:

1. In a mechanical stoker of the type comprising a main casing having side walls and a forward furnace attaching portion, and also having operating means including a rotating shaft extending therethrough in close proximity to the said furnace attaching portion, the ends of the said shaft projecting interiorly through openings of the casing side walls substantially larger than the shaft, a delivery apron, housings having portions removably interfitting the said side wall openings of the casing and having the major portions thereof extending outwardly beyond the casing walls, said housings having at their inner ends trunnions extending through and projecting inwardly beyond the casing walls and supporting said delivery apron, said housings having their said inner portions and said trunnions bored to receive the said shaft, the outer portions of the housings having counterbores around the shaft, bearings arranged in said counterbores, means within the outer portions of the counterbores to confine the said bearings, and water cooling means connected to the outwardly projecting portions of the housings to maintain the housings and the adjacent portions of the shaft, the inwardly projecting trunnions and the casing side walls in a cool efficiently operating condition.

2. In a mechanical stoker of the type comprising a main casing having a furnace attaching portion and having operating means including a rotating shaft adjacent to said attaching portion, said casing including side walls having oppositely disposed openings therein around the said shaft, a delivery apron, housings removably interfitting the said openings of the casing walls and having annular flanges abutting and secured to the walls, said housings projecting for their major portions outwardly beyond the walls and having annular water chambers and aligned openings receiving the ends of the said operating shaft and enlarged at the outer portions of the housings to form bearing chambers, bearings removably arranged in said bearing chambers and interposed between the shaft and the inner walls of the water chambers, and means carried by the outer portions of the housings for removably retaining the bearings therein, said housings being provided at their inner ends with trunnions extending through and projecting inwardly beyond the casing walls and supporting said delivery apron and provided with bores forming extensions of the shaft receiving openings of the housings.

3. In a mechanical stoker of the class described, the combination with a main casing provided with an attaching portion to be secured to a furnace and having side walls provided with oppositely disposed openings, operating means including a shaft extending through the openings in the said side walls, bearings for the shaft and a delivery apron, of means for detachably supporting the shaft and the bearings and for cooling the latter comprising housings snugly and removably interfitting the said openings of the casing walls and having annular flanges abutting and secured to the outer faces of the casing walls, said housings having their major portions projecting outwardly beyond the casing walls and provided with annular water chambers and aligned openings receiving the ends of the operating shaft and enlarged at the outer portions of the housings to form bearing chambers receiving the said bearings and having inner annular end walls to abut the bearings and interiorly threaded at their outer portions, said housings being also provided at their inner ends with integral trunnions extending through and projecting inwardly beyond the casing walls and supporting the delivery apron and having bores forming extensions of the shaft receiving openings of the housings, annular closure members surrounding the said shaft and exteriorly threaded and engaging the threaded portions of the walls of the bearing chambers for removably retaining the bearings therein, exterior annular ribs formed integral with and projecting from the casing walls and spaced from and surrounding the openings thereof and exteriorly fitting and partially housing the annular flanges of said housings, and water circulating means including inlet and outlet pipes connected with the annular water chambers at the top and bottom of the housings, the circulation of water through the housings being adapted to maintain the housings, the bearings, the trunnions, and adjacent portions of the shaft and the side walls of the casing in an efficiently cooled operating condition.

WILLIAM EDGAR DEMILL.